United States Patent [19]

La Rue

[11] Patent Number: 5,454,062
[45] Date of Patent: Sep. 26, 1995

[54] METHOD FOR RECOGNIZING SPOKEN WORDS

[75] Inventor: Charles La Rue, La Canada, Calif.

[73] Assignee: Audio Navigation Systems, Inc., La Canada, Calif.

[21] Appl. No.: 999,062

[22] Filed: Dec. 31, 1992

Related U.S. Application Data

[63] Continuation-in-part of Ser. No. 675,632, Mar. 27, 1991, Pat. No. 5,274,560.

[51] Int. Cl.$^6$ ........................................ G10L 9/00
[52] U.S. Cl. .................................. 395/2.63; 395/2.6
[58] Field of Search .......................... 395/2, 2.4, 2.48, 395/2.6, 2.63, 2.84; 381/29–47

[56] References Cited

U.S. PATENT DOCUMENTS

| | | | |
|---|---|---|---|
| Re. 32,012 | 10/1985 | Pirz et al. | 395/2.84 |
| 4,242,731 | 12/1980 | Mizote et al. | 364/436 |
| 4,277,644 | 7/1981 | Levinson et al. | 395/2.5 |
| 4,489,435 | 12/1984 | Moshier | 395/2.63 |
| 4,502,123 | 2/1985 | Minami et al. | 364/424 |
| 4,630,209 | 12/1986 | Saito et al. | 364/444 |
| 4,677,429 | 6/1987 | Glotzbach | 340/711 |
| 4,679,147 | 7/1987 | Tsujii et al. | 364/449 |
| 4,758,959 | 7/1988 | Thoone et al. | 364/454 |
| 4,761,815 | 8/1988 | Hitchcock | 395/2.64 |

(List continued on next page.)

FOREIGN PATENT DOCUMENTS

| | | |
|---|---|---|
| 0372840 | 6/1990 | European Pat. Off. . |
| 3719017 | 12/1988 | Germany . |
| 62-108111 | 5/1987 | Japan . |

OTHER PUBLICATIONS

SAE Technical Paper Series, vol. 870139, Warrendale, Pa., 1987, M. L. G. Thoone et al.: "The Car Information and Navigation System Carin and the Use of Compact Disc Interface."

IEEE Transactions on Instrumentation and Measurement, vol. 37, No. 4, Dec. 1988, New York, US, pp. 586–590; S. S. Awad: "Voice Technology in the Instrumentation of the Automobile."

U.S. application Ser. No. 07/675,632, filed Mar. 27, 1991, now allowed and will be issued as U.S. Pat. No. 5,274,560.

"Computer Software Information Management,"; Lesk, Scientific American, vol. 251, No. 3, Sep. 1984.

Search report, International application Ser. No. PCT/US93/12690, filed Dec. 30, 1993.

*Primary Examiner*—Allen R. MacDonald
*Assistant Examiner*—Michelle Doerrler
*Attorney, Agent, or Firm*—Spensley Horn Jubas & Lubitz

[57] ABSTRACT

A method for identifying any one of a plurality of utterances using a programmed digital computing system, each utterance having an audible form representable by a sequence of speech elements each having a respective position in the sequence. In the computing system, a digital representation corresponding to each of the plurality of utterances is stored a designation respective identifying is assigned to each utterance. A table composed of a plurality of entries is created, each entry being associated with a unique combination of a particular speech element and a particular position in the sequence of speech elements of the audible form of an utterance and storing in each entry the identifying designation of each of the plurality of utterances whose audible form is represented by a speech element sequence containing the particular speech element at the particular position with which that entry is associated; converting an utterance to be identified and spoken by a person into a sequence of speech elements each having a respective position in the sequence; reading each table entry associated with a speech element and position combination corresponding to the combination of a respective position in the sequence of the spoken utterance and the particular speech element at the respective position in the sequence of the spoken utterance; and determining which identifying designation appears most frequently in the entries which have been read in the reading step.

14 Claims, 1 Drawing Sheet

U.S. PATENT DOCUMENTS

| | | | |
|---|---|---|---|
| 4,796,189 | 1/1989 | Nakayama et al. | 364/449 |
| 4,797,924 | 1/1989 | Schnars et al. | 381/43 |
| 4,827,520 | 5/1989 | Zeinstra | 381/43 |
| 4,829,578 | 5/1989 | Roberts | 381/46 |
| 4,866,778 | 9/1989 | Baker | 395/2.6 |
| 4,882,696 | 11/1989 | Nimura et al. | 364/449 |
| 4,907,159 | 3/1990 | Mauge et al. | 364/436 |
| 4,954,958 | 9/1990 | Savage et al. | 364/444 |
| 4,984,168 | 1/1991 | Neukrichner et al. | 364/449 |
| 4,985,924 | 1/1991 | Matsuura | 395/2.63 |
| 5,041,983 | 8/1991 | Nakahara et al. | 364/449 |
| 5,089,826 | 2/1992 | Yano et al. | 342/457 |
| 5,115,399 | 5/1992 | Nimura et al. | 364/449 |
| 5,125,022 | 6/1992 | Hunt et al. | 379/88 |
| 5,126,941 | 6/1992 | Gurmu et al. | 364/464.02 |
| 5,303,299 | 4/1994 | Hunt | 381/43 |

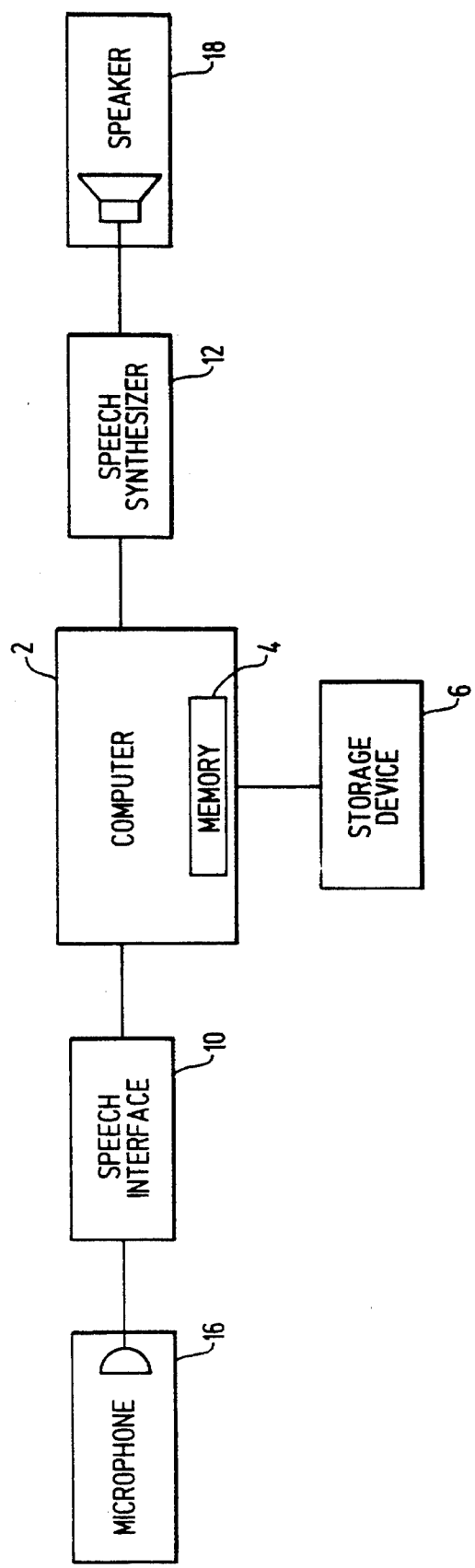

METHOD FOR RECOGNIZING SPOKEN WORDS

CROSS-REFERENCE TO RELATED APPLICATION

This application is a continuation-in-part of my application Ser. No. 675,632, filed on Mar. 27, 1991, now U.S. Pat. No. 5,274,560. The disclosure of that application and the computer listings submitted therewith are incorporated herein by reference.

BACKGROUND OF THE INVENTION

It is generally recognized that man-machine interaction can be enhanced by the ability to communicate audibly, or orally. A variety of interfaces have been developed, including input devices which identify spoken words and output devices which produce synthesized speech. While significant advances have been made with regard to output devices, which respond to well-defined signals, input devices have posed more difficult problems.

Such input devices must convert spoken utterances, i.e. letters, words, or phrases, into the form of electrical signals, and must then process the electrical signals to identify the spoken utterances. By way of example: acoustic signals constituting spoken utterances may be sampled at fixed intervals; the pattern formed by a succession of sampled values may then be compared with stored patterns representing known spoken utterances; and the known spoken utterance represented by the stored pattern which matches the pattern of sampled values most closely is assumed to be the actual spoken utterance. The input devices which have already been proposed could, in theory, function with a high degree of reliability. However, in the present state of the art, they are operated by programs which entail long processing times that prevent useful results from being achieved in acceptably short time periods.

One commercially available program for recognizing spoken utterances is marketed by Lernout and Hauspie Speech Products U.S.A., Inc., of Woburn, Mass. under the product name CSR-1000 Algorithm. This company also offers a key word spotting algorithm under the product name KWS-1000 and a text-to-speech conversion algorithm under the product name TTS-1000. These algorithms are usable on conventional PCs having at least a high-performance 16 bit fixed or floating DSP processor and 128 KB of RAM memory.

The CSR-1000 algorithm is supplied with a basic vocabulary of, apparently, several hundred words each stored as a sequence of phonemes. A spoken word is sampled in order to derive a sequence of phonemes. The exact manner in which such sequence of phonemes is processed to identify the spoken word has not been disclosed by the publisher of the program, but it is believed that this is achieved by comparing the sequence of phonemes derived from the spoken word with the sequence of phonemes of each stored word. This processing procedure is time consuming, which probably explains why the algorithm employs a vocabulary of only several hundred words.

It would appear that the CSR-1000 algorithm could be readily configured to recognize individual spoken letters.

Speech recognition of large isolated word vocabularies of 30,000 words or more requires that the utterances be broken into phonemes or other articulatory events or, alternatively, that the user verbally spell the word, in which case, his utterances of the letters of the alphabet are recognized by their phoneme content and then the sequence of letters is used to identify the unknown word. In any large vocabulary system, both methods are needed to insure accuracy. The user would first attempt to have the word recognized by simply saying the word. If this was unsuccessful, the user would then have the option of spelling the word.

A problem occurs with spelling, however, because the English alphabet is not easily recognized by speech recognition system. For example, almost all recognizers have trouble distinguishing the letter "B" from the letter "P", the letter "J" from "K", the letter "S" from the letter "F" and so on. In fact, most of the alphabet consists of single syllable utterances which rhyme with some other utterance. Similarly, many phonemes which sound alike can be mis-recognized. Clearly, it is necessary for a speech recognition system to deal with the errors caused by rhyming letters or phonemes.

SUMMARY OF THE INVENTION

It is an object of the present invention to identify spoken utterances with a high level of reliability.

A further object of the invention is to identify spoken utterances relatively quickly.

A further object of the invention is to provide the capability of identifying a large number of different spoken utterances without requiring a cumbersome storage unit.

A further object of the invention is to provide a means by which recognition of spelled words can be greatly increased by incorporation of a rhyming spelling checker which takes into account the probability of mis-recognition of letters which sound alike.

A further object of the invention is to provide a means by which recognition of spoken words can be greatly increased by incorporation of a rhyming phoneme checker which takes into account the probability of mis-recognition of phonemes which sound alike.

A further object of the invention is to provide a means by which recognition of a spelled word in a large vocabulary can be achieved even though the user misspells the word by changing or transposing some of the letters or by deleting or adding letters to the word.

The above and other objects are achieved, according to the invention, by a method for identifying any one of a plurality of utterances using a programmed digital computing system, each utterance having an audible form representable by a sequence of speech elements, and each speech element having a respective position in the sequence, the method comprising: storing, in the computer system, a digital representation corresponding to each of the plurality of utterances and assigning a respective identifying designation to each utterance; creating a table composed of a plurality of entries, each entry being associated with a unique combination of a particular speech element and a particular position in the sequence of speech elements of the audible form of an utterance and storing in each entry the identifying designation of each of the plurality of utterances whose audible form is represented by a speech element sequence containing the particular speech element at the particular position with which that entry is associated; converting an utterance to be identified and spoken by a person into a sequence of speech elements each having a respective position in the sequence; reading at least each table entry associated with a speech element and position combination corresponding to the combination of a respective position in the sequence of the spoken utterance and the particular speech element at the respective position in the sequence of the spoken utterance; and determining which identifying designation appears most frequently in the entries which have been read in the reading step.

To implement the invention, a collection of words to be recognized, i.e. the "vocabulary" of the system, are stored in a first database, with each word being assigned an identifying designation, e.g. an identifying number.

As a practical matter, every spoken word is made up of a string of phonemes, or articulatory events, which occur in a specific sequence. A few words and a number of letters such as "e" and "o" may consist of a single phoneme which may be recognized by a system according to the invention. Letters will typically consist of one or two phonemes and may be recognized by a system according to the invention.

A spoken language appears to consist of a defined number of distinct phonemes, each of which is identifiable by a specific symbol. It is generally considered that English-language words contain 50–60 different phonemes and in the description of the present invention, each phoneme is assigned a respective numerical value.

Different speakers of a language may pronounce a word differently so that a given word may be composed of phoneme strings which differ from one another. To minimize recognition errors resulting from such speech variations, it is known to have a selected word spoken by a number of different speakers, determine the phoneme string for the word spoken by each speaker, and derive a mean or average phoneme value for each word portion for which the speakers produced a number of different phonemes.

BRIEF DESCRIPTION OF THE DRAWING

The sole FIGURE is a block diagram of a system for practicing the present invention.

DESCRIPTION OF THE PREFERRED EMBODIMENTS

The FIGURE is a block diagram illustrating a system which can be employed to implement the present invention. The heart of the system is a conventional, general purpose computer 2, such as a PC containing a RAM memory 4 having a capacity of at least 200 KB. Computer 2 is equipped, in the usual manner, with a keyboard, a monitor and means for connecting computer 2 to peripheral components.

Associated with computer 2 is a storage device 6, which may be installed within computer 2. Storage device 6 may be a hard disk, a floppy disk, a ROM, a PROM, an EPROM, an EEPROM, a flash memory, an optical disk, etc. One possibility is to constitute storage device 6 as an optical disk or compact disk player which could form part of a separate audio system installed, for example, in an automobile.

Connected to computer 2 are peripheral devices including a speech interface unit 10 and a speech synthesizer 12. Input to speech interface unit 10 is provided by a microphone 16, while the output from speech synthesizer 12 is delivered to a speaker 18. If storage device 6 is constituted by a disk player in an audio system, speaker 18 may be constituted by the speaker or speakers of that audio system.

According to one feature of the present invention, the storage medium of storage device 6 contains the operating program for recognizing spoken utterances, along with a first database containing representations of the utterances to be recognized and an associated identifying designation for each stored utterance and a second database in the form of a table composed of a plurality of entries. The identifying designations provided in the first database are stored in appropriate entries of the table constituting the second database in a manner which will be described in greater detail below.

Speech synthesizer 12 and speaker 18 are connected to generate and emit spoken utterances constituting prompts for the user of the system and the recognized versions of utterances spoken by the user.

The storage medium may be of a type, such as an optical disk, which can store the utterances in a form that can be directly reproduced, possibly via an amplifier and/or a digital/analog converter. In these cases, speech synthesizer 12 can be replaced by such components.

The basic operation of the system is as follows. At the start of operation, the portions of the operating program which must be resident in memory 4 are loaded therein from storage device 6. The operating program portion loaded into memory 4 may include that program portion which serves to convert spoken utterances into sequences of phonemes, which is a capability of the CSR-1000 algorithm referred to earlier herein. Then, an utterance spoken by a user of the system is picked up by microphone 16 and converted into an electrical analog signal which is delivered to interface 10. Depending on the program employed to derive sequences of phonemes, interface 10 may place the analog signal at a suitable voltage level and conduct it to computer 2, or may convert the analog signal into the form of digital samples. The spoken utterance is converted into a sequence of phonemes and this sequence is processed, according to the invention in order to identify the stored utterance which corresponds to the spoken utterance. Then, a sequence of phonemes associated with that stored utterance is conducted to speech synthesizer 12 and emitted in audible form by speaker 18 to allow the user to verify that the spoken utterance was correctly recognized. The computer may then, under control of its operating program, generate further audible utterances which may be prompts to the user to input a further spoken utterance containing certain information or may be output information derived from the information previously supplied in spoken form by the user.

According to alternative embodiments of the invention, the spoken utterances are letters which spell a word. In this case, the identity of each letter is determined by matching its phoneme or phonemes with stored patterns and the resulting sequence of letters constitutes the sequence of speech elements which are processed to identify the correct stored utterance.

Furthermore, embodiments of the invention need not reproduce a stored utterance in audible, or any other, form. Instead, the stored utterances may constitute machine instructions which correspond to respective spoken utterances and which act to cause a machine to perform a desired operation.

To cite one non-limiting example, the invention may be employed in a navigation system of the type disclosed in the above-cited U.S. Pat. No. 5,274,560, in which case the user will be prompted to supply, in spoken form, identification of starting and destination points and will then be provided with a series of route directions. If the spoken information supplied by the user is in the form of spellings of starting and destination locations, the system may prompt the user to input each successive letter.

The invention will be described with respect to a generalized embodiment in which a first database contains data identifying words, with each word being assigned an identifying number. The standard, or average, phoneme string associated with the spoken version of each word is determined by conventional procedures. Each phoneme in a string is located at a respective position, n, and each distinct phoneme is assigned a value m.

The structure of this first database is illustrated by TABLE 1, below, which represents a large vocabulary database containing K words in which, for each word, there is provided a respective identifying number (id#) and data representing a letter and/or phoneme sequence which can be used for displaying and/or sounding the word for verification and/or for locating information about the word in connection with a specific application.

TABLE 1

| id# | Word letter sequence | Word phoneme sequence |
|---|---|---|
| 1 | . | . |
| 2 | . | . |
| . | . | . |
| 101 | ALABAMA | a-l-a-b-a-m-a |
| 102 | ARIZONA | a-r-i-z-o-n-a |
| 103 | BRAZIL | b-r-a-z-i-l |
| 104 | CHICAGO | c-h-i-c-a-g-o |
| 105 | SEATTLE | s-e-a-t-t-l-e |
| 106 | ATLANTA | a-t-l-a-n-t-a |
| 107 | ARICONE | a-r-i-c-o-n-e |
| . | . | . |
| K | . | . |

Then a second database is prepared as shown herebelow in TABLE 2, which shows a large vocabulary database containing subsets {n,m} of identifying numbers from the first database for words having the phoneme or letter m at position n of the phoneme or letter string.

TABLE 2

| n→ | 1 | 2 | 3 | 4 | ... | N |
|---|---|---|---|---|---|---|
| m 1 ↓ | {1,1} | {2,1} | {3,1} | {4,1} | ... | {N,1} |
| 2 | {1,2} | {2,2} | {3,2} | {4,2} | ... | {N,2} |
| . | . | . | . | . | | . |
| M-1 | {1,M-1} | {2,M-1} | {3,M-1} | {4,M-1} | ... | {N,M-1} |
| M | {1,M} | {2,M} | {3,M} | {4,M} | ... | {N,M} |

Each entry in the second database is a subset (represented by {n,m}) containing the identifying numbers of all words in the first database for which phoneme or letter position n contains phoneme or letter m.

In TABLE 2, the total number of phoneme or letter positions in a string is a maximum of N and the total number of different phonemes or letters is M. The value of N is selected to assure that essentially all phonemes or letters of each word can be accounted for. Below, for the sake of brevity, reference will be made to phonemes. It should be understood, however, that as a general rule reference to letters would be equally appropriate.

The system is further provided with a scoring memory, or table, containing a number of locations equal to the number of words in the first database; each location is associated with a respective word identifying number.

A spoken word is analyzed in order to derive its characteristic phoneme string. The string will have N or fewer phonemes and each phoneme can have any one of M different values.

The phoneme value, m, of the spoken word at the first location in the string (n=1) is identified and for each member of the subset {1, m}, a score is placed in every scoring memory location associated with an identifying number in subset {1, m}. Then the phoneme value, m, of the spoken word at the second location in the string (n=2) is identified and, as above, for each member of the subset {2, m}, a score is placed in every scoring memory location associated with an identifying number in subset {2, m}. This score will be added to any score previously placed in any of the scoring locations associated with an identifying number in subset {2, m}.

This procedure continues for the entire phoneme string of the spoken word, or for a string of N phonemes, where N may be larger or smaller than the number of phonemes in the string of the spoken word. After the phoneme string has been processed, the scoring memory is interrogated and the word whose identifying number corresponds to that of the scoring memory location which has the highest score is determined to be the spoken word.

It has been found that this procedure will yield the correct word a surprisingly high percentage of the time.

Then, the stored data is read from the location of the first database which has the corresponding identifying number. The stored data can be used to reproduce the word in spoken form, as described above.

The system will then await a spoken response from the user.

In order to reduce the frequency of recognition errors, the system according to the present invention selects, from the scoring table, the utterance designations for the utterances which received the three highest scores, these designations being delivered in descending order of the scores. The stored utterance associated with each selected identifying designation is then delivered to speech synthesizer 12 and emitted in spoken form from speaker 18. After each synthesized utterance is emitted, the system waits for a response from the user, e.g. either "yes" or "no". If the user responds with a "no" after each synthesized utterance is heard, it is concluded that the recognition process failed, the scoring memory is cleared, and the user is prompted, if necessary, to repeat the spoken utterance. It is anticipated that such failures will be extremely rare.

The storage of utterance identifying designations in the form of a table, as described above, represents a substantial improvement over the prior art because it results in a substantial reduction in the amount of data which must be processed in order to arrive at an identification of the spoken utterance. Specifically, for each position in the sequence of speech elements of a spoken utterance, it is only necessary to access the table entry associated with that speech element position and the particular speech element at that position of the spoken utterance. In other words, to correctly identify the spoken utterance, it is not necessary to access all of the entries in the table.

In TABLE 2, the speech elements represented by m may either be phonemes or letters of the alphabet. Correspondingly, the speech element positions represented by n will be either the positions of phonemes in a sequence or the positions of letters in a word, respectively.

The invention, as described thus far, is implemented by reading only one entry of the second database table for each speech element position (n). However, it has been found that when each spoken utterance is a word which is converted into a string of phonemes, the speaker may pronounce the word in such a manner as to add or delete one or two phonemes. If this should occur, the spoken word will not be correctly recognized. According to a further feature of the invention, the probability of achieving correct recognition is increased by taking into account the entries associated with a particular phoneme which are immediately adjacent that entry associated with the correct position n. For example, referring to TABLE 2 above, if the phoneme at position n=3 of the spoken word is being compared with the stored data, and the value of this phoneme is 2, the identifying numbers in at least subsets {2, 2} and {4, 2} will additionally be used to include a score in the scoring memory. Subsets {1, 2} and {5, 2} can additionally be used in the same manner. Although it might, on first consideration, appear that this would reduce the probability of achieving correct recognition, it has, surprisingly, been found that quite the opposite is true and that this stratagem will, in fact, increase the probability of correct recognition.

In addition, account may be taken of the fact that phonemes which rhyme can be misunderstood by the device or program which interprets each spoken phoneme. In order to minimize errors resulting from such incorrect identification of individual phonemes, all of the entries associated with a given phoneme position (n) and with a phoneme (m) which rhymes with the phoneme that the system determined to have been spoken are also read and a score is placed in the scoring table for each identifying number which has been read.

If the spoken word is inputted by spelling that word, then the speech elements will be letters, i.e. alphabetic characters, and the sequence of speech elements will be a sequence of letters in which each letter occupies a particular position. A simplified example of this implementation will be presented below, using the words having id# 101–107 of TABLE 1.

In TABLE 3 below, the distribution of identifying numbers in the second database is illustrated. Thus, if the first letter of the spoken word is the letter "A", it is only necessary to interrogate the subset {1,A} of TABLE 3, and so on for the remaining letters. It will be noted that, for the sake of simplicity, it has been assumed that each word has a maximum of seven letters. However, the second database can be established to identify words having any selected maximum number of letters.

TABLE 3

| m ↓ | n → 1 | 2 | 3 | 4 | 5 | 6 | 7 |
|---|---|---|---|---|---|---|---|
| A | 101 |   | 101 | 106 | 101 |   | 101 |
|   | 102 |   | 103 |   | 104 |   | 102 |
|   | 106 |   | 105 |   |   |   | 106 |
|   | 107 |   |   |   |   |   |   |
| B | 103 |   |   | 101 |   |   |   |
| C | 104 |   |   | 104 |   |   |   |
|   |   |   |   | 107 |   |   |   |
| D |   |   |   |   |   |   |   |
| E |   |   | 105 |   |   |   | 105 |
|   |   |   |   |   |   |   | 107 |
| F |   |   |   |   |   |   |   |
| G |   |   |   |   |   | 104 |   |
| H |   | 104 |   |   |   |   |   |
| I |   |   | 102 |   | 103 |   |   |
|   |   |   | 104 |   |   |   |   |
|   |   |   | 107 |   |   |   |   |

TABLE 3-continued

| m ↓ | n → 1 | 2 | 3 | 4 | 5 | 6 | 7 |
|---|---|---|---|---|---|---|---|
| L |   | 101 | 106 |   |   | 103 |   |
|   |   |   |   |   |   | 105 |   |
| M |   |   |   |   |   | 101 |   |
| N |   |   |   |   | 106 | 102 |   |
|   |   |   |   |   |   | 107 |   |
| O |   |   |   |   | 102 |   | 104 |
|   |   |   |   |   | 107 |   |   |
| R |   | 102 |   |   |   |   |   |
|   |   | 103 |   |   |   |   |   |
|   |   | 107 |   |   |   |   |   |
| S | 105 |   |   |   |   |   |   |
| T |   | 106 |   | 105 | 105 | 106 |   |
| Z |   |   |   |   | 102 |   |   |
|   |   |   |   |   | 103 |   |   |

In the example illustrated in TABLE 3, it has again been assumed that only one subset {n,m} is addressed for each letter of the spoken word. However, it has been found that the probability of correct recognition of a word which has been inputted in the form of spelling can be enhanced by applying two stratagems.

Firstly, it may occur not infrequently that when one spells a word, a letter will be omitted or added. In this case, if only the subset contained in one entry of the second database is read for each letter of the word to be identified, the probability of correct identification is reduced. According to the first stratagem relating to this implementation of the invention, for a given letter position in the word to be interrogated, the entries to either side of the correct entry are also read and a score is placed in the scoring memory for each of those entries. Thus, if what is believed to be the fourth letter of the spoken word is being considered, and the letter is "A", not only will subset {4, A} be read, but also subsets {3, A} and {5, A}.

According to the second stratagem, account is taken of the fact that letters which rhyme can be misunderstood by the device or program which interprets each spoken letter. For example, "A" can easily be confused with "K" and "B" can be confused with "C", "D", "E", etc. In order to minimize errors resulting from such incorrect identification of individual letters, all of the entries associated with a given letter position (n) and with a letter (m) which rhymes with the letter that the system determined to have been spoken are also read and a score is placed in the scoring table for each identifying number which has been read.

Although, here again, it may, on first consideration, appear that these stratagems would reduce the probability of correct identification of a spoken word which has been inputted by spelling, it has, surprisingly, been found that quite the opposite it true. The scores appearing in the scoring memory for those letters which were incorrectly interpreted will invariably be lower than the score for the correct word.

A scoring memory may be conceptualized as having a structure as shown below in TABLE 4 in which a score is accumulate for each word on the basis of the number of times the id# for that word was read in TABLE 2 or 3 according to one of the procedures described above.

TABLE 4

| id# | Score |
|-----|-------|
| 1 | Accumulated score for word 1 |
| 2 | Accumulated score for word 2 |
| . | . |
| . | . |
| . | . |
| K | Accumulated score for word K |

For scoring purposes, each time a particular id# is found in an entry of the second database, this constitutes a scoring "hit" for that id#. Depending on the stratagem employed, i.e. taking into account rhyming phonemes or letters or the addition or deletion of one letter or one or two phonemes in the spoken word to be identified, several entries may be read for each speech element position of the word to be identified. In this case, each "hit" may be weighted on the basis of various factors.

By way of example, the following scoring scheme may be employed when the second database is explored, or read, for evaluating each speech element position of the spoken word to be identified.

For each id# in an entry at row n which exactly matches the associated letter or phoneme of the spoken word, a weight of 10 is assigned; for each id in an entry at a row associated with a letter or phoneme which rhymes with that at row m, a weight of 6 is assigned. This will apply for id#s in the column n associated with the particular spoken word speech element position and in each other column of the second database (n±1,2) which is read to take account of letter or phoneme additions or deletion when the word was spoken. For each such id#, a hit value of 1 is assigned;

Then, for each hit in the column n corresponding exactly to the spoken word speech element position, a hit value of 1 is added to the previous hit value;

If an id# is in the row m which exactly matches the associated letter or phoneme of the spoken word (and, the same id# was in the row which exactly matched the associated letter or phoneme of the spoken word) for the immediately preceding speech element position of the spoken word, a further hit value of 1 is added to the previous hit value;

then the total hit value is multiplied by the weight and is divided by the number of speech elements, i.e. letters or phonemes, in the spoken word. This division assures that longer words will not get higher scores just because of their length;

The resulting score is placed in the scoring memory for each id#.

Finally, for each id# whose stored word whose letter of phoneme string has a length exactly equal to that of the spoken word, an additional score, which may equal 10 is added to the scoring memory.

After all speech element positions of the spoken word have thus been compared with the stored data, the scoring memory locations containing scores can be sorted in descending order of scores and the id#s associated with the three highest scores are outputted.

It will thus be seen that the data processing sequence according to the present invention is relatively simple. After a spoken word has been processed by known techniques to derive a letter of phoneme string, the letter or phoneme at each position of the string is used as a reference to determine which entries of the second database are read, scores are accumulated in the scoring memory, and after all positions of the spoken word string have been considered, the scoring memory is sorted.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What s claimed:

1. A method for identifying any one of a plurality of words using a programmed digital computing system each word having an audible form representable by a sequence of speech elements, with each speech element having a respective position in the sequence, comprising:

storing, in the digital computing system, a digital representation corresponding to each of the plurality of words and assigning a respective identifying designation to each word;

creating a table composed of a plurality of entries, each entry being associated with a unique combination of a particular speech element and a particular position in the sequence of speech elements of the audible form of a word and storing in each entry the identifying designation of each of the plurality of words whose audible form is represented by a speech element sequence containing the particular speech element at the particular position with which that entry is associated;

receiving a sequence of speech elements spoken by a person and representing one of the plurality of words, and storing representations of the received speech elements and their respective positions in the spoken sequence;

reading each table entry associated with a respective position and speech element combination corresponding to the combination of a respective position in the sequence of received speech elements and the particular received speech element at the respective position in the sequence of spoken speech elements; and determining which identifying designation appears most frequently in the entries which have been read in said reading step.

2. A method as defined in claim 1 further comprising reproducing the word to which the determined identifying designation is assigned.

3. A method as defined in claim 1 further comprising using the digital representation corresponding to the word to which the determined identifying designation is assigned to control an operation of a machine.

4. A method as defined in claim 1 wherein each speech element is a letter and the audible form of the word consists of the spelling of the word.

5. A method as defined in claim 1 wherein each speech element is a phoneme.

6. A method for identifying any one of a plurality of utterances using a programmed digital computing system, each utterance having an audible form representable by a sequence of speech elements each having a respective position in the sequence, comprising:

storing, in the digital computing system, a digital representation corresponding to each of the plurality of utterances and assigning a respective identifying designation to each utterance;

creating a table composed of a plurality of entries, each entry being associated with a unique combination of a particular speech element and a particular position in the sequence of speech elements of the audible form of an utterance and storing in each entry the identifying designation of each of the plurality of utterances whose audible form is represented by a speech element sequence containing the particular speech element at the particular position with which that entry is associated;

receiving a sequence of speech elements spoken by a person and representing one of the plurality of utterances and storing representations of the received speech elements and their respective positions in the spoken sequence;

reading each table entry associated with a respective position and speech element combination corresponding to the combination of a respective position in the sequence of spoken speech elements and the particular spoken speech element at the respective position in the sequence of spoken speech elements;

determining a plurality of identifying designations that appear with the greatest frequencies in the entries which have been read in said reading step;

reproducing the utterance to which is assigned the determined identifying designation that appears with the highest frequency; and reproducing, in response to an indication by the person that the reproduced utterance is not the utterance represented by the spoken speech elements, the utterance to which is assigned the determined identifying designation that appears with the second highest frequency.

7. A method as defined in claim 6 wherein each speech element is a letter of a word and each utterance consists of spelling of a word.

8. A method as defined in claim 6 wherein each speech element is a phoneme.

9. A method for identifying any one of a plurality of utterances using a programmed digital computing system, each utterance having an audible form representable by a sequence of speech elements each having a respective position in the sequence, wherein each speech element has at least one identifiable acoustic characteristic and a plurality of the speech elements are substantially identical with respect to the at least one identifiable acoustic characteristic, comprising:

a) storing, in the digital computing system, a digital representation corresponding to each of the plurality of utterances and assigning a respective identifying designation to each utterance;

b) creating a table composed of a plurality of entries, each entry being associated with a unique combination of a particular speech element and a particular position in the sequence of speech elements of the audible form of an utterance and storing in each entry the identifying designation of each of the plurality of utterances whose audible form is represented by a speech element sequence containing the particular speech element at the particular position with which that entry is associated;

c) receiving a sequence of speech elements spoken by a person and representing one of the plurality of utterances and storing representations of the received speech elements and their respective positions in the spoken sequence;

d) reading each table entry associated with a respective position and speech element combination corresponding to each combination of
1) a respective position in the sequence of the spoken speech elements and,
2) at the respective position in the sequence, one of
i) the particular speech element spoken by the person and
ii) each speech element which is substantially identical to the particular speech element with respect to the at least one identifiable acoustic characteristic; and e) determining which identifying designation appears most frequently in the entries which have been read in said reading step.

10. A method as defined in claim 9 wherein each speech element is a letter of a word and each utterance consists of spelling of a word.

11. A method as defined in claim 9 wherein each speech element is a phoneme.

12. A method for identifying any one of a plurality of utterances using a programmed digital computing system, each utterance having an audible form representable by a sequence of speech elements each having a respective position in the sequence, wherein each speech element has at least one identifiable acoustic characteristic and a plurality of the speech elements are substantially identical with respect to the at least one identifiable acoustic characteristic, comprising:

a) storing, in the digital computing system, a digital representation corresponding to each of the plurality of utterances and assigning a respective identifying designation to each utterance;

b) creating a table composed of a plurality of entries, each entry being associated with a unique combination of a particular speech element and a particular position in the sequence of speech elements of the audible form of an utterance and storing in each entry the identifying designation of each of the plurality of utterances whose audible form is represented by a speech element sequence containing the particular speech element at the particular position with which that entry is associated;

c) receiving a sequence of speech elements spoken by a person and representing one of the plurality of utterances and storing representations of the received speech elements and their respective positions in the spoken sequence;

d) reading each table entry associated with a respective position and speech element combination corresponding to each combination of
1) one of a respective position in the sequence of the spoken speech elements and a position in the sequence adjacent the respective position, and
2) the particular spoken speech element at the respective position in the sequence; and e) determining which identifying designation appears most frequently in the entries which have been read in said reading step.

13. A method as defined in claim 12 wherein each speech element is a letter of a word and each utterance consists of spelling of a word.

14. A method as defined in claim 12 wherein each speech element is a phoneme.

* * * * *